Patented June 16, 1942

2,286,881

UNITED STATES PATENT OFFICE 2,286,881

METHOD OF TREATING HYDROLYZABLE TITANIUM SALT SOLUTIONS

Foord Von Bichowsky, Arden, Del., assignor to E. I. du Pont de Nemours & Company, Wilmington, Del., a corporation of Delaware No Drawing. Application August 29, 1939, Serial No. 292,403

8 Claims. (Cl. 23—202)

This invention relates to the production of titanium oxide pigments and particularly to the production of rutile titanium oxide from titanium chloride solutions. More particularly, it relates to a novel process for stabilizing or deactivating titanium chloride solutions used in the preparation of rutile titanium oxide pigments.

Titanium chloride solutions used in various hydrolysis procedures for titanium oxide pigment production, unless in true crystalloidal form by reason of careful dilution, are objectionably turbid and highly reactive. If permitted to stand, particularly at room temperature, this turbidity increases and a precipitate will ultimately settle out from the solution. This instability and turbidity arises by reason of the presence of so-called "wild seeds" or nuclei in such solutions. Upon being subjected to hydrolysis, these turbid reactive solutions yield precipitates which usually comprise anatase instead of the desired rutile titanium oxide.

I have found that titanium chloride solutions may be effectively stabilized and clarified through a novel method of treatment, whereby on subsequent hydrolysis said solutions will yield an essentially rutile titanium oxide precipitate. It is among the particular objects of this invention, therefore, to provide a novel process for effecting such stabilization and clarification. Further objects include: the provision of a convenient and effective method for removing from turbid titanium chloride solutions material which which induces such turbidity and also all components which result in the development of turbidity therein and subsequent deposition of a precipitate on standing at ordinary room temperature. An additional and particular object is to so alter titanium chloride solutions which normally give anatase precipitates that titanium oxide precipitates substantially in the rutile form will result on hydrolysis and ultimate production will be assured of a pigment possessing the highest refractive index and potential hiding power.

These and other objects are attained in this invention which comprises subjecting a titanium chloride solution useful in titanium pigment hydrolysis to relatively moderate heat treatment, but short of hydrolysis, whereby said solution becomes effectively stabilized and deactivated through coagulation and removal of substances which cause its turbidity and activation.

In a more specific and preferred embodiment, the invention comprises, prior to hydrolysis, subjecting a relatively turbid or active titanium chloride solution to heat treatment at temperatures ranging from substantially 55 to 75° C. until coagulation occurs of the active ingredients present therein, thereupon cooling said solution and removing the settled coagulates.

In carrying out the invention, a hydrolyzable titanium chloride solution obtained from any desired source, as by dissolving titaniferous materials in hydrochloric acid in accordance with well-known methods, is subjected, prior to hydrolysis, to relatively moderate or mild heat treatment, sufficient in extent and duration, however, to effect coagulation of the coagulatable material present therein at the temperatures of treatment employed. The extent of heating thus effected, however, is insufficient to effect any hydrolysis of said chloride solution, and is preferably relatively short in duration and at temperatures ranging from substantially 55 to 75° C. Preferably, also, the solution is maintained at such treating temperatures until coagulates settle out therein, after which the solution is suitably cooled and filtered to remove such settled material. As a result of such treatment, a readily hydrolyzable, stabilized and clarified titanium chloride solution results which will remain clear and stable even after prolonged standing at room temperatures. Furthermore, said clarified solution, when employed in conventional hydrolysis procedures, such as that described in U. S. Patent 2,062,133, will be found on hydrolysis to yield precipitates which are essentially in the rutile crystalline form.

To a more complete understanding of the invention, the following examples are given, each being merely in illustration but not in limitation of my invention:

Example 1

Titanium chloride solution was prepared indirectly from anatase raw pigment by forming sodium paratrititanate, $Na_2Ti_3O_7$, and dissolving the latter compound in HCl. The $TiCl_4$ solution thus obtained was turbid, and on standing a considerable amount of sediment collected on the bottom of the vessel. A portion of this solution was hydrolyzed according to the following procedure. The solution was seeded with 3 per cent on the $TiO_2$ basis of a nucleating material prepared by neutralizing a part of the solution with $NH_4OH$ to precipitate orthotitanic acid, washing the precipitate free of soluble chlorides and peptizing by heating for 20 minutes at 80° C. at a concentration of 30 grams $TiO_2$ per liter and 0.3 normal with respect to HCl. The concentration of the seeded solution of $TiCl_4$ was adjusted to 110 grams $TiO_2$ per liter and the solution heated to 95° C. and held at that temperature for 30 minutes. The raw pigment precipitate was a mixture consisting of 50 per cent rutile and 50 per cent anatase.

Another portion of this solution was heated slowly to 60° C. over a period of 4½ hours. The solution became more opaque between 40 and 50° C. apparently due to the coagulation of the colloidal material. When the temperature reached 59° C., the solution was filtered to remove the coagulated material. The filtrate was a clear solution. When the solution was hydrolyzed by the procedure mentioned above, the precipitate was essentially rutile, indicating that all "wild seeds" had been eliminated by the heat treatment.

*Example II*

Titanium chloride solution was prepared indirectly from plant titanium sulfate solution as follows. One part of the plant titanium sulfate solution containing 190 grams $TiO_2$ per liter was run into 100 parts water held at 80° C. and the mixed solution held at 80° C. for 5 minutes. The precipitate was separated from the mother liquor, the $H_2SO_4$ contained therein was neutralized by $NH_4OH$, and the soluble sulfate ions removed by washing. The desulfated precipitate was dissolved in HCl to give a solution of $TiCl_4$ containing 127 grams $TiO_2$ per liter. The solution was divided into three parts which were treated as follows:

One part of the solution, with no further treatment, was hydrolyzed according to the procedure described under Example I above. The raw pigment from this hydrolysis was all anatase according to the well-known X-ray method of analysis.

The remaining portion of the $TiCl_4$ solution was "cured" by heating to 67° C. and holding at this temperature for 15 minutes. The solution was then filtered. The "cured" solution was clear and inactive, i. e., did not produce any additional precipitate on standing at room temperature, as did the "uncured" portion. The solution was hydrolyzed according to the same procedure used for the preceding portion of the $TiCl_4$ solution. The precipitate was found to consist essentially of rutile.

As indicated, the invention is applicable to the treatment of all types of titanium chloride solutions adapted for use in the hydrolysis of titanium oxide pigments. Similarly, although certain preferred and specific temperatures have been mentioned above as utilizable herein, the invention is not limited thereto. In general, I contemplate using all temperatures, short of those actually hydrolyzing in character which are adapted to effect clarification and stabilization of said titanium chloride solutions, whereby such solutions become non-turbid and non-reactive in character. Accordingly, I generally contemplate employing temperatures ranging from substantially 45° to 80° C., and preferably from about 55 to 75° C., but in any event below the temperature at which hydrolysis occurs at the titanium concentrations employed.

As will be apparent, the invention is highly useful in making available for the production of rutile, solutions which otherwise would produce anatase on hydrolysis, and is particularly effective in the treatment of solutions which are obtained by dissolving titaniferous materials in hydrochloric acid, such as those obtained by dissolving orthotitanic acid or sodium titanate in hydrochloric acid.

Also, the invention affords an advantageous procedure for obtaining rutile titanium oxide pigments, since the titanium chloride solutions resulting from dissolution of titaniferous materials are rendered stable and therefore do not change in concentration or in other characteristics on standing and prior to hydrolysis. Furthermore, such solutions are more readily filterable and the hydrolysis precipitates obtained therefrom are, as stated, essentially rutile rather than anatase.

While, as stated, my invention is particularly adapted for use in the purification or stabilization of titanium chloride solutions, it also possesses utility in the processing of solutions of titanium in combination with monobasic acids in general. Such operations are therefore to be considered as within the scope of the invention. Titanium salt solutions, in which the negative radical is a monobasic acid, e. g., titanium chloride, titanium bromide, titanium nitrate, titanium perchlorate, etc., can be stabilized by the methods outlined above, with similar results.

The time required for the above referred to stabilization process will be found to be somewhat variable with the concentration of the solution, as well as the methods used in the preparation of the same. In general, I prefer to consume relatively long periods with the more concentrated solutions and relatively shorter periods when the dilution is increased. Also, shorter periods are in order when higher temperatures are employed. I find it advntageous to complete the stabilization treatment within about 12 hours and, for the chloride solutions in particular, the time preferred is less than about 5 hours. Usually, a period of treatment ranging from, say, 10 or 15 minutes to about 30 minutes or one hour will ordinarily suffice, depending upon the temperature employed and $TiO_2$ concentration of the liquor under treatment.

I claim as my invention:

1. A process for producing a substantially clear, non-turbid, hydrolyzable titanium chloride solution which is stable on standing at room temperature, comprising subjecting a hydrolyzable titanium chloride solution which is substantially free from undesired metallic impurities to heat treatment at a relatively moderate temperature but below that at which substantial $TiO_2$ precipitation and hydrolysis of said solution will be effected, and thence prior to hydrolysis removing coagulated materials which form in said solution as a result of such treatment.

2. A process for producing a hydrolyzable, clarified and substantially non-turbid, clear titanium chloride solution which is stable on standing at room temperature, comprising subjecting a hydrolyzable titanium chloride solution which is substantially free from undesired metallic impurities to heat treatment at a temperature below that at which substantial $TiO_2$ precipitation and hydrolysis of said solution will be effected, thence prior to hydrolysis cooling said solution and removing therefrom the coagulates which settle out therein as a result of such treatment.

3. A process for clarifying a hydrolyzable titanium chloride solution in order to stabilize the same for standing at room temperature and obtain precipitated rutile titanium oxide therefrom on hydrolysis, comprising subjecting a hydrolyzable titanium chloride solution which is substantially free from undesired metallic impurities to heat treatment at temperatures below the hydrolyzing temperature for said solution but ranging from substantially 45° C. to 80° C. without effecting any substantial TiO$_2$ precipitation, and thereafter prior to hydrolysis removing from the solution the coagulated material which forms therein as a result of said treatment.

4. A process for clarifying a titanium chloride solution, in order to stabilize the same for standing at room temperature and obtain precipitated rutile titanium oxide therefrom on hydrolysis, comprising subjecting a hydrolyzable titanium chloride solution which is substantially free from undesired metallic impurities to heat treatment at temperatures below the hydrolyzing temperature for said solution but ranging from substantially 45° C. to 80° C. without effecting any substantial TiO$_2$ precipitation, thence, prior to hydrolysis, cooling the so-treated solution and removing therefrom the coagulated material which settles out therein as a result of said treatment.

5. A process for clarifying a titanium chloride solution in order to stabilize the same for standing at room temperature and obtain precipitated rutile titanium oxide therefrom on hydrolysis, comprising subjecting a hydrolyzable titanium chloride solution which is substantially free from undesired metallic impurities to heat treatment at a temperature below the hydrolyzing temperature for said solution but ranging from substantially 45° C. to 80° C. for a period of time sufficient to precipitate coagulatable material present therein but without effecting any substantial TiO$_2$ precipitation, thereafter, but prior to hydrolysis, cooling the treated solution which results and removing therefrom the coagulates which settle out therein as a result of such treatment.

6. A process for clarifying a titanium chloride solution in order to stabilize the same for standing at room temperature and insure the obtainment of precipitated rutile titanium oxide therefrom on hydrolysis thereof, comprising subjecting a hydrolyzable titanium chloride solution which is substantially free from undesired metallic impurities to heat treatment at temperatures below the hydrolyzing temperature for said solution but ranging from substantially 55° C. to 75° C. for a relatively short period of time but without effecting any substantial TiO$_2$ precipitation, and thereafter, prior to hydrolysis, removing from the so-treated solution the deposited material which settles out therein as a result of said treatment.

7. A process for clarifying a titanium chloride solution in order to stabilize the same for standing at room temperature and obtain precipitated rutile titanium oxide therefrom on hydrolysis, comprising subjecting a hydrolyzable titanium chloride solution which is substantially free from undesired metallic impurities to heat treatment without effecting any substantial TiO$_2$ precipitation at temperatures below the hydrolyzing temperature for said solution but ranging from substantially 55° C. to 75° C. for a relatively short period of time, thence, prior to hydrolysis, subjecting said solution to cooling treatment, and filtering the cooled solution to remove therefrom the coagulatable material which settles out therein as a result of said treatment.

8. A process for rendering a hydrolyzable, monobasic acid titanium solution substantially non-turbid, clear and stabilized for standing at room temperature, comprising subjecting a hydrolyzable, monobasic acid solution which is substantially free from undesired metallic impurities to heat treatment at a relatively moderate temperature below substantially that at which hydrolysis of said solution and substantial TiO$_2$ precipitation occurs, and, prior to hydrolysis, removing from the so-treated solution the coagulated materials which form therein as a result of such heat treatment.

FOORD VON BICHOWSKY.